(12) United States Patent
Liang

(10) Patent No.: US 8,430,626 B1
(45) Date of Patent: Apr. 30, 2013

(54) TURBINE VANE WITH MATE FACE SEAL

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 534 days.

(21) Appl. No.: 12/840,676

(22) Filed: Jul. 21, 2010

(51) Int. Cl.
*F01D 25/26* (2006.01)
*F28F 7/00* (2006.01)

(52) U.S. Cl.
USPC .......................................... 415/139; 277/412

(58) Field of Classification Search .................. 277/412, 277/637, 641, 644; 415/134, 135, 139; 416/189–192, 193 A, 193 R
See application file for complete search history.

(56) References Cited

U.S. PATENT DOCUMENTS

| 7,527,472 B2 * | 5/2009 | Allen | 415/139 |
| 7,887,286 B2 * | 2/2011 | Abgrall et al. | 415/119 |
| 8,201,834 B1 * | 6/2012 | Liang | 277/637 |

* cited by examiner

*Primary Examiner* — Nathaniel Wiehe
*Assistant Examiner* — Woody A Lee, Jr.
(74) *Attorney, Agent, or Firm* — John Ryznic

(57) ABSTRACT

A stator vane with a mate-face cooling and sealing arrangement, the vane end rails include an upper axial U-shaped seal slot and a lower axial U-shaped seal slot with an upper U-shaped riffle seal and a lower U-shaped riffle seal secured within the two axial U-shaped seal slots. The two U-shaped seals form a box-like arrangement with riffle teeth formed on the top sides of a horizontal plate for each of the U-shaped seals.

3 Claims, 6 Drawing Sheets

TURBINE VANE WITH MATE FACE SEAL

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a gas turbine engine, and more specifically to a stator vane with a mate face seal.

2. Description of the Related Art Including Information Disclosed Under 37 CFR 1.97 and 1.98

A gas turbine engine, such as a large frame heavy duty industrial gas turbine (IGT) engine, includes a turbine with one or more stages of stator vanes to guide a hot gas flow toward a downstream row of rotor blades. Stator vanes are typically made in segments with one or more airfoils extending between an outer shroud and an inner shroud. Because the turbine operates under a high temperature, thermal expansion of the stator vane segments requires a loose fit at the engine cold state so that any gaps are closed when the parts are at the high operating temperature.

FIG. 1 shows two stator vane segments each with a single airfoil 11 with a prior art vane mate-face cooling and sealing arrangement. The airfoil extends between endwalls 12 or shrouds and is attached to the engine through aft hooks 13. In the FIG. 1 vane mate-face design, there is no built-in scheme or any sealing arrangement to prevent hot gas ingression along an axial gap at a junction between two adjacent vane rails 14 as well as misalignment between two abutting vane end rails. FIG. 2 shows a detailed cross section view of the vane mate-face seal design for two adjacent mate-faces. Each mate-face includes a slot 15 in which a feather seal 16 is placed to seal a gap 17 between the two mate-faces. Impingement cavities 18 are formed on the top surface to provide impingement cooling for the endwalls. Metering holes 19 formed in an impingement plate 21 deliver cooling air to the impingement cavities 18 and then to the gap 17 to cool the mate-face and to purge hot gas flow from passing into the gap 17. A TBC (thermal barrier coating) 20 is applied on the hot gas side of the endwalls. FIG. 2 shows a riffle seal used to seal the mate face gap in a prior art turbine stator vane like FIG. 1.

As a result of the FIG. 1 structure, hot gas flows in and out along the mate-face gaps and creates an over-temperature at the vane rails corresponding to the hot gas injection location. In addition, use of a feather seal for the sealing mate-face gap will not provide for a good seal or alignment of the vanes. FIG. 3 shows the feather seal positioned against an upper surface of the slots due to the pressure acting on the feather seal from below. FIG. 4 shows the feather seal positioned against a lower surface of the slot due to pressure acting on the feather seal from above. FIG. 5 shows the feather seal out of alignment due to the two adjacent vane segments being out of alignment.

BRIEF SUMMARY OF THE INVENTION

A mate-face cooling and sealing arrangement for stator vanes in which the mate-face of each vane includes a double U-shaped seal, where each U-shaped seal includes a horizontal plate with a closer formation of teeth on one surface and smooth on the other surface for the purpose of allowing for tight fit into the seal slot. The seal also includes two vertical plates on each side of the horizontal plate for the purpose of stabilizing the rail alignment.

The two U-shaped seals are installed into the axial and the vertical gaps formed by the two vane mate face rails. The two U-shaped seal are installed with the opened side of each seal facing each other such that the flat sides of each seal are located on the outer sides of the seals. A box formation is formed with the two U-shaped seals installed in this orientation and a relative movement of the vane segments is minimized and a reduction of the leakage flow through the vane mate face gap during engine operation is achieved. Circumferential growth will be built into the seal slots to account for redial movement.

DETAILED DESCRIPTION OF THE INVENTION

Figure 1:
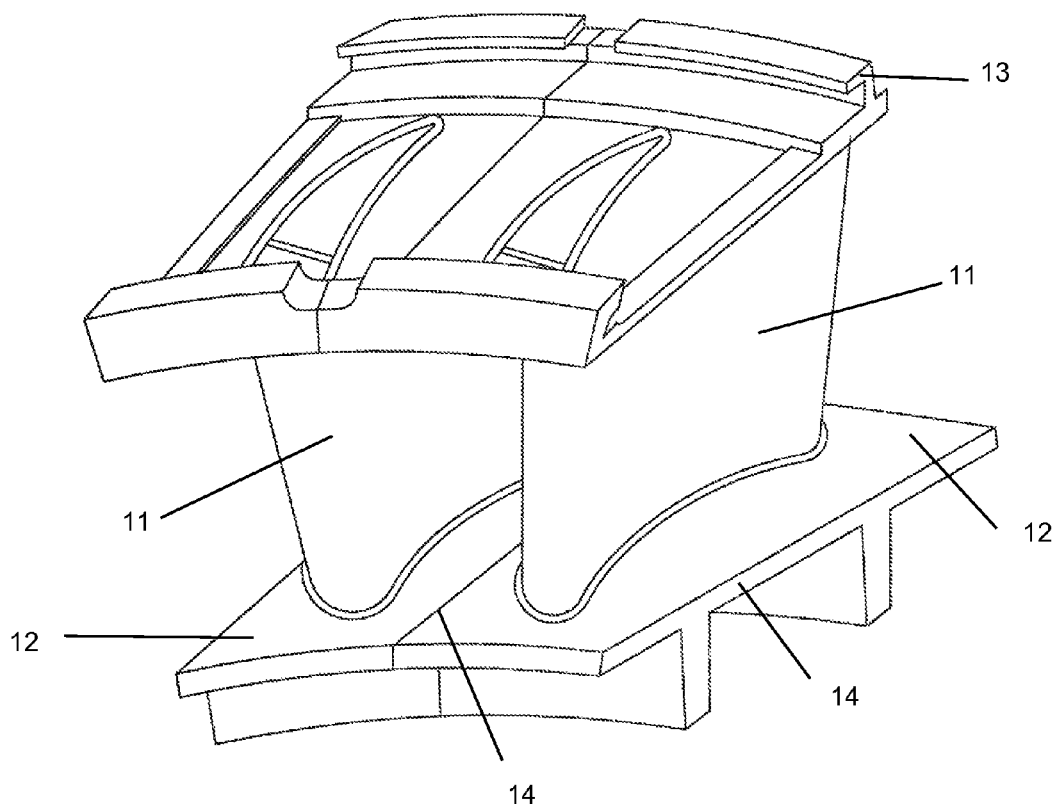
FIG. 1 shows a schematic view of two stator vanes with a mate-face cooling and sealing arrangement of the prior art.
Figure 2:
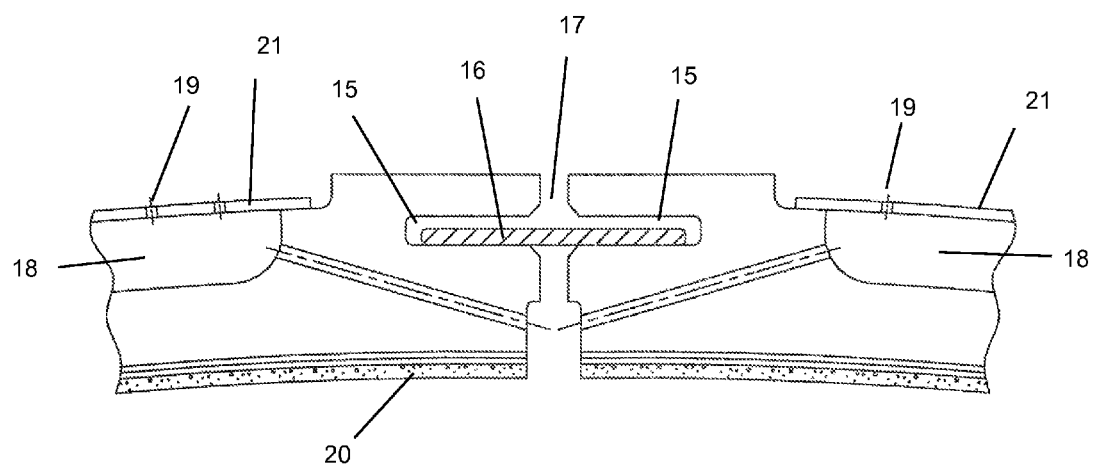
FIG. 2 shows a detailed cross section view of the mate-face sealing and cooling design of FIG. 1 along an axial gap direction.
Figure 3:
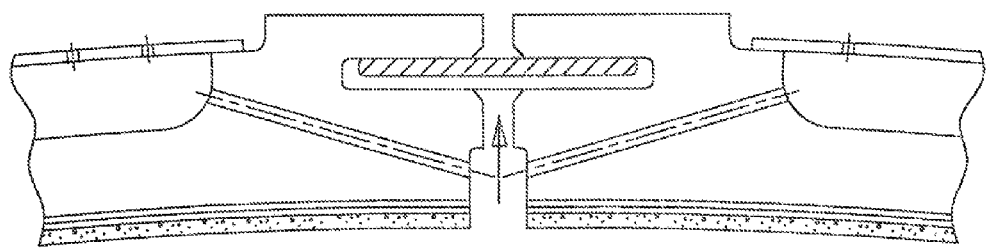
FIG. 3 shows a cross section view of the mate face sealing design of FIG. 2 with the feather seal positioned against a top side of the slot.
Figure 4:
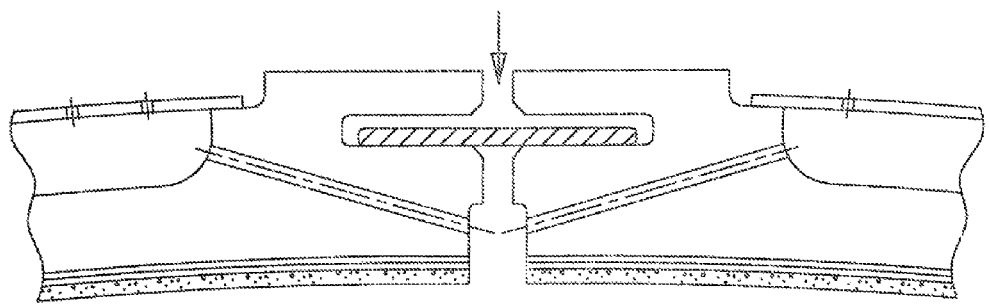
FIG. 4 shows a cross section view of the mate face sealing design of FIG. 2 with the feather seal positioned against a bottom side of the slot.
Figure 5:
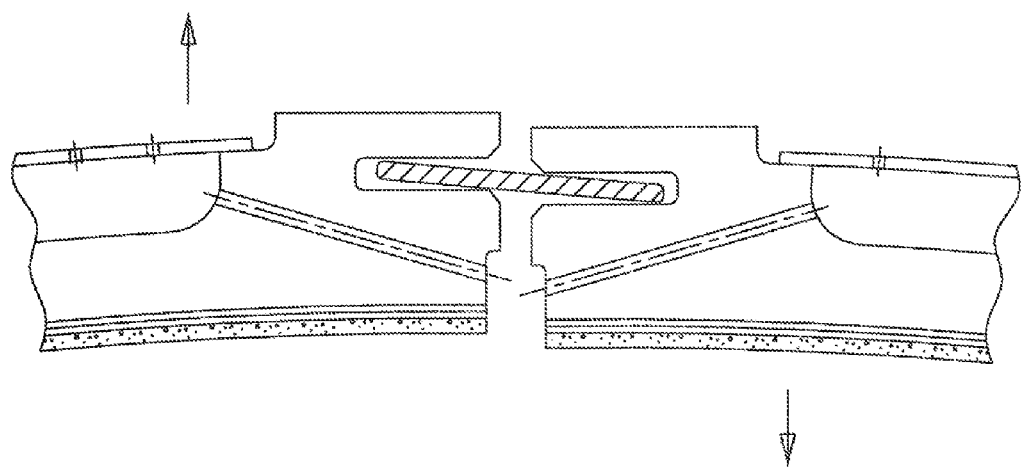
FIG. 5 shows a cross section view of the mate face sealing design of FIG. 2 with the vane segments out of alignment and the feather seal twisted within the two adjacent seal slots.
Figure 6:
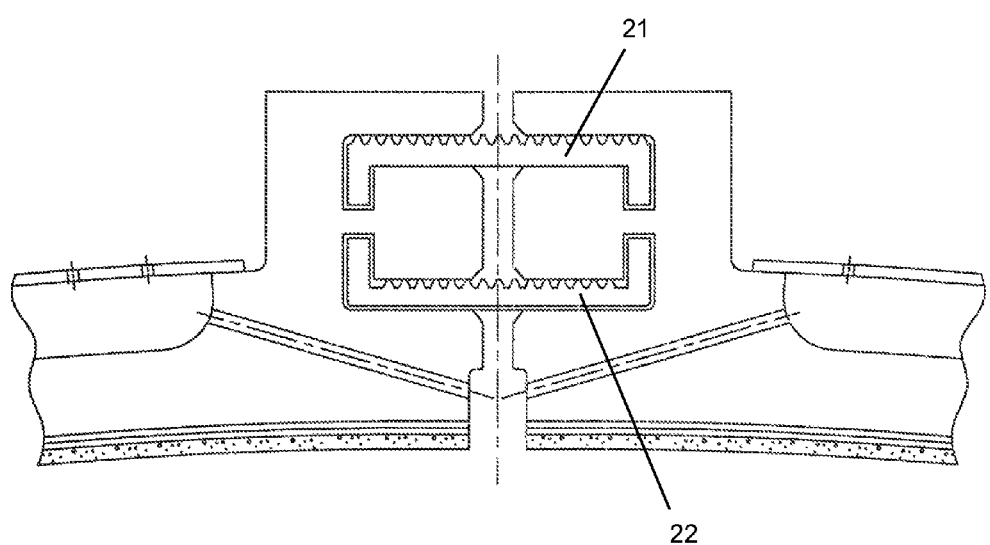
FIG. 6 shows a cross section view of the mate face seal design of the present invention.

A turbine stator vane with a mate-face sealing and cooling design of the present invention is intended for use in a large framed heavy duty industrial gas turbine engine, but could also be used in other types of gas turbine engines that require seals between adjacent mate faces with a gap. FIG. 6 shows two adjacent vane mate faces each with a seal slot that is U-shaped with an upper or top seal slot and a lower or bottom seal slot. The vane mate faces include the prior art impingement plates with metering and impingement holes and the gap cooling holes of the prior art. The present invention differs in the shape and features of the two U-shaped seals and slots.

Figure 7:
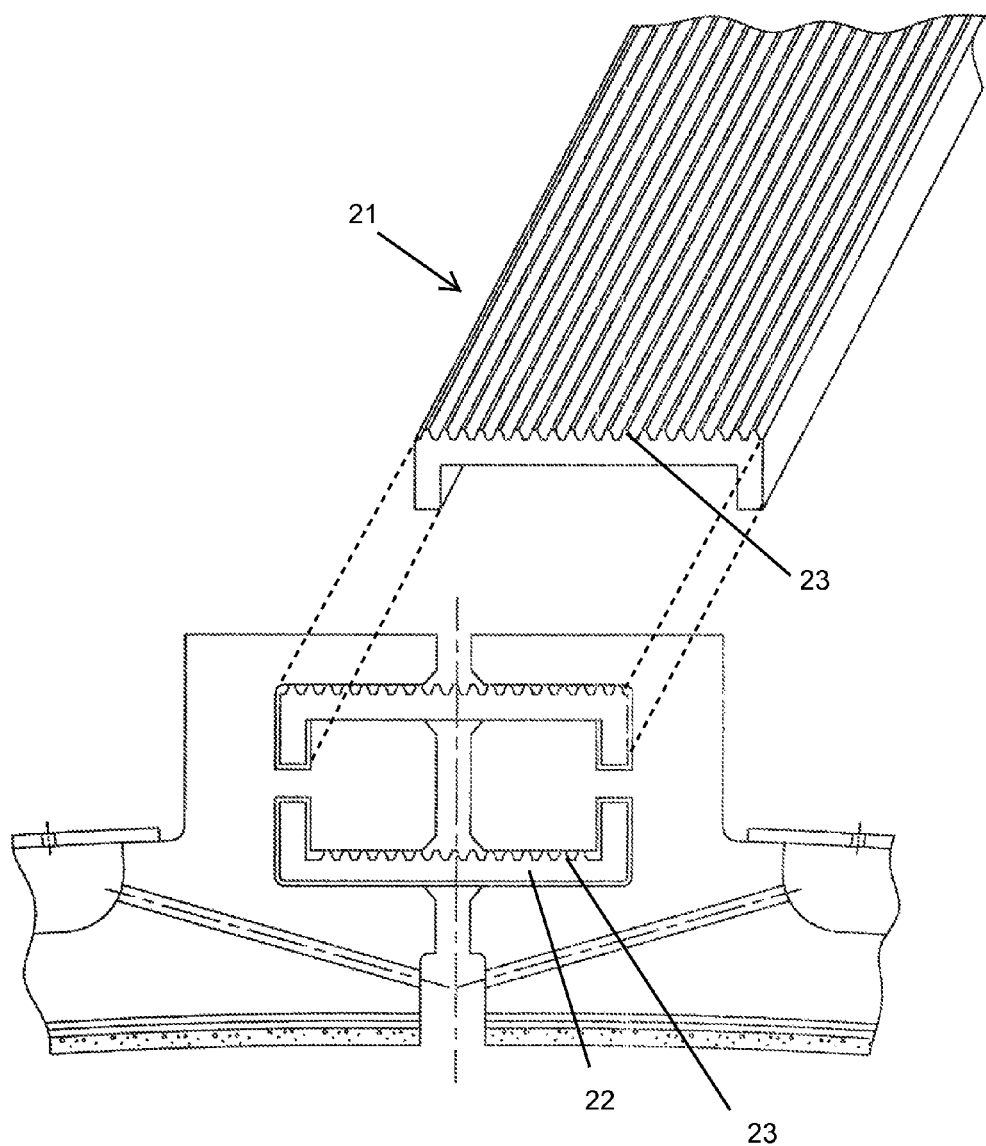
FIG. 7 shows a projection view of the U-shaped seal within the seal slot of the vane mate faces of the present invention.

FIG. 6 shows an upper U-shaped seal 21 and a lower U-shaped seal 22 positioned to form a box-like shape. Each of the two U-shaped seals 21 and 22 has a horizontal plate with two vertical plates on the ends. The upper U-shaped seal 21 has the two vertical plates projecting downward while the lower U-shaped seal 22 has the two vertical plates projecting upward. Both the upper and lower U-shaped seals have teeth formed on a top surface of the horizontal plate as seen in FIG. 6. The teeth form a U-shaped riffle seal that will produce a tight fit within the seal slots. The bottom sides of the horizontal plates have a smooth surface. Each of the U-shaped seals 21 and 22 extend along the entire length of the mate faces. FIG. 7 shows a projection view of the upper U-shaped seal 21 within the mate face seal slots.

The seal is installed into the axial and the vertical gaps formed by the two vane mate face rails. The inner seal 22 is installed with the U-shape seal facing upward so that the smooth surface on the bottom side of the horizontal plate is facing the hot gas flow oath. The outer seal 21 is installed with the U-shape seal facing downward with the smooth surface on the top side of the horizontal plate facing outward from the gap. As a result of this arrangement, a box-like formation is formed by the vertical plates of both seals. This will minimize any relative movement for the vane segments and reduce the leakage flow through the vane mate face gap during engine operation.

In operation, cooling air impinges onto the backside surface of the vane O.D. endwall. The spent cooling air is then discharged along the vane rail peripheral holes for cooling of the rails and also channeled through the vane airfoil for cooling of the vane. A portion of the cooling air is bled through the metering holes and then discharged into the short vertical spacing formed by the vane mate face and the U-shaped seals. This cooling air is then discharged into the hot flow path to provide for cooling for the vane rail edge. The combination effects of reduced hot gas ingestion into the mate face, a shortened mate face gap open to the hot gas and the discharging of cooling air to purge the mate face gap provides for a very effective cooling arrangement for cooling and sealing of the vane mate face.

I claim:

1. A stator vane mate face cooling and sealing assembly comprising:
   a first vane endwall with a first vane end rail;
   a second vane endwall with a second vane end rail;
   an upper U-shaped slot formed in the first and second vane end rails;
   a lower U-shaped seal slot formed in the first and second end rails;
   a first U-shaped seal secured within the upper U-shaped slots;
   a second U-shaped seal secured within the lower U-shaped slots; and,
   the first and second U-shaped seals both have open sides facing each other.

2. The stator vane mate face cooling and sealing assembly of claim 1, and further comprising:
   both the upper and the lower U-shaped seals have a horizontal plate with two vertical plates on the sides of the horizontal plate.

3. The stator vane mate face cooling and sealing assembly of claim 2, and further comprising:
   both the upper and the lower U-shaped seals have riffle teeth formed on a top side of the horizontal plate.

* * * * *